United States Patent
Wiemker et al.

(10) Patent No.: US 12,482,123 B2
(45) Date of Patent: Nov. 25, 2025

(54) MAKING MEASUREMENTS IN IMAGES

(71) Applicant: KONINKLIJKE PHILIPS N.V., Eindhoven (NL)

(72) Inventors: Rafael Wiemker, Kisdorf (DE); Tom Brosch, Hamburg (DE); Hrishikesh Narayanrao Deshpande, Hamburg (DE); André Goossen, Eldena (DE); Tim Philipp Harder, Ahrensburg (DE); Axel Saalbach, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 640 days.

(21) Appl. No.: 17/785,071

(22) PCT Filed: Dec. 16, 2020

(86) PCT No.: PCT/EP2020/086315
§ 371 (c)(1),
(2) Date: Jun. 14, 2022

(87) PCT Pub. No.: WO2021/122666
PCT Pub. Date: Jun. 24, 2021

(65) Prior Publication Data
US 2023/0030618 A1 Feb. 2, 2023

(30) Foreign Application Priority Data
Dec. 19, 2019 (EP) ........................... 19217854

(51) Int. Cl.
*G06T 7/00* (2017.01)
*G06F 17/18* (2006.01)
*G06T 7/11* (2017.01)
*G06T 7/60* (2017.01)
*G06T 7/73* (2017.01)

(52) U.S. Cl.
CPC .............. *G06T 7/60* (2013.01); *G06T 7/0012* (2013.01); *G06T 7/11* (2017.01); *G06T 2207/20081* (2013.01)

(58) Field of Classification Search
USPC ......... 128/916, 920, 922–925; 382/128–180; 706/1–62, 900–903
See application file for complete search history.

(56) References Cited

U.S. PATENT DOCUMENTS

2007/0100226 A1* 5/2007 Yankelevitz .......... G06T 7/0012
600/407
2014/0355821 A1* 12/2014 Solem ................ G06V 10/7557
382/103

(Continued)

OTHER PUBLICATIONS

PCT International Search Report, International application No. PCT/EP2020/086315, Mar. 18, 2021.

(Continued)

*Primary Examiner* — Marcellus J Augustin

(57) ABSTRACT

A computer implemented method of making a measurement associated with a feature of interest in an image. The method comprises using (302) a model trained using a machine learning process to take the image as input and predict a pair of points between which to make the measurement of the feature of interest in the image. The method then comprises determining (304) the measurement, based on the predicted pair of points.

21 Claims, 5 Drawing Sheets

(56) References Cited

U.S. PATENT DOCUMENTS

| | | | |
|---|---|---|---|
| 2019/0099159 A1 | 4/2019 | Voigt | |
| 2019/0148011 A1* | 5/2019 | Rao | A61B 8/54 600/437 |
| 2019/0171871 A1* | 6/2019 | Zhang | G06V 40/103 |
| 2019/0172224 A1* | 6/2019 | Vajda | G06N 3/045 |
| 2019/0183366 A1 | 6/2019 | Dehghan Marvast | |
| 2020/0037997 A1* | 2/2020 | Viggen | A61B 8/5223 |
| 2020/0161005 A1* | 5/2020 | Lyman | G06N 5/04 |
| 2020/0211277 A1* | 7/2020 | Rugolo | G06T 7/50 |
| 2020/0345331 A1* | 11/2020 | Ebata | G16H 30/40 |

OTHER PUBLICATIONS

Stern D. et al., "Regressing Heatmaps for Multiple Landmark Localization Using CNNs", Medical Image Computing and Computer-Assisted Intervention—MICCAI 2016, Lecture Notes in Computer Science( ), vol. 9901, pp. 230-238, Springer, Cham, Oct. 2016.

Sun Y. et al., "Deep Convolutional Network Cascade for Facial Point Detection", Proceedings of the IEEE Conference on Computer Vision and Pattern Recognition (CVPR), 2013, pp. 3476-3483.

Seymour L. et al., "iRECIST: Guidelines for Response Criteria for Use in Trials Testing Immunotherapeutics", Lancet Oncology, vol. 18, No. 3, pp. e143-e152, Mar. 2017.

Liu L. et al., "EASL- and mRECIST-Evaluated Responses to Combination Therapy of Sorafenib with Transarterial Chemoembolization Predict Survival in Patients with Hepatocellular Carcinoma", Journal of Clinical Cancer Research, vol. 20, Issue 6, pp. 1623-1716, Mar. 2014.

Ecabert O. et al., "Automatic Model-Based Segmentation of the Heart in CT Images", IEEE Transactions on Medical Imaging, vol. 27, No. 9, pp. 1189-1201, Sep. 2008.

\* cited by examiner

MAKING MEASUREMENTS IN IMAGES

CROSS-REFERENCE TO PRIOR APPLICATIONS

This application is the U.S. National Phase application under 35 U.S.C. § 371 of International Application No. PCT/EP2020/086315, filed on Dec. 16, 2020, which claims the benefit of European Patent Application No. 19217854.9, filed on Dec. 19, 2019. These applications are hereby incorporated by reference herein.

FIELD OF THE INVENTION

Embodiments herein relate to imaging and making measurements in images.

BACKGROUND OF THE INVENTION

This disclosure lies in the area of image analysis. In fields such as medical imaging, it is often necessary to determine a length of a feature of interest (e.g. object) in an image. In the medical field, for example, many radiological findings are reported as length measurements, for example, organ sizes, tumor sizes, vessel calibers, bronchial lumen, etc. Such length measurements can be decisive for therapeutic decision making and progression monitoring, etc. The Response Evaluation Criteria in Solid Tumors (RECIST; see paper by Seymour et al. 2017 entitled "*iRECIST: guidelines for response criteria for use in trials testing immunotherapeutics*") is one example of a diagnostic procedure that uses measurements in this way.

It is an object of embodiments herein to improve methods of making measurements in images including, but not limited to medical images.

SUMMARY OF THE INVENTION

In medical imaging, measurements are often generated in an interactive way by the reading radiologist or radiographer, using an electronic caliper tool. An electronic caliper may comprise a pair of endpoints, that may be depicted as a graphical axis or circle overlaid over the radiological image.

Interactive caliper measurements may be a costly workload burden, and may suffer from inter-reader variability and subjectivity. Therefore improved methods of making measurements in images are desirable for both reasons.

Conventional approaches towards automated axis length measurement are usually based on a combined anatomical-mathematical definition, e.g. a segmentation of a specific organ may be performed, followed by a determination of the mathematically longest axis in 2D or 3D of the corresponding segment for the organ. An optimality criterion may also be applied to yield a physically meaningful objective result, e.g. "the boundary is defined at the location of highest image gradient".

However, many radiological measurements are customary, having been developed and modified over many years, for which the users may not be able to provide a clear mathematical description or objective. For example, a radiographer may describe a particular measurement with respect to specific landmarks that are difficult to define mathematically. Furthermore, there may be caveats to a measurement. A measurement may be made according to complex and detailed criteria. An example of a caveated measurement criteria could be, for example: "landmark xxx to this landmark yyy, about halfway between aaa and bbb, except for the presence of ccc, then it is more relevant to ignore yyy and measure towards ddd, but if eee is resected, then we measure to the tri-touch point of organs fff and ggg with hhh; we prefer to select a slice where the aorta or iii is visible, but only if not showing streaking artifacts; necrotic areas should not be intersected; select the window/level such that the cortex becomes just visible . . . ." Such criteria are thus difficult to capture algorithmically. There is therefore a need to provide improved methods of automating measurement capture in images, such as medical images.

Thus, according to a first aspect, there is a computer implemented method of making a measurement associated with a feature of interest in an image. The method comprises using a model trained using a machine learning process to take the image as input and predict a pair of points between which to make the measurement of the feature of interest in the image and determining the measurement, based on the predicted pair of points.

In this manner, a machine learning model may be trained and used to predict appropriate end points between which to make a measurement of a feature of interest in an image, based on the image itself. In this way, a model may be trained to inherently take complex measurement criteria into account, without the criteria needing to be explicitly coded. The model may be trained using a wide range of images, for example, images annotated with the correct placement of the measurement, as determined by different expert annotators. In this way, the model may combine the experience of all of the annotators into a single model, thus providing improved measurements compared to any individual annotator.

According to a second aspect there is a method of training a model for use in making a measurement associated with a feature of interest in an image. The method comprises providing training data to the model, the training data comprising: i) example images; and ii) for each image, a ground truth pair of points indicating appropriate locations between which to make the measurement of the feature of interest in the example image. The method then comprises training the model to predict the associated ground truth pair of points for each example image.

According to a third aspect there is a system for making a measurement associated with a feature of interest in an image. The system comprises a memory comprising instruction data representing a set of instructions, and a processor configured to communicate with the memory and to execute the set of instructions. The set of instructions, when executed by the processor, cause the processor to use a model trained using a machine learning process to take the image as input and predict a pair of points between which to make the measurement of the feature of interest in the image, and determine the measurement, based on the predicted pair of points.

According to a fourth aspect there is a computer program product comprising computer readable medium comprising a computer readable medium, the computer readable medium having computer readable code embodied therein, the computer readable code being configured such that, on execution by a suitable computer or processor, the computer or processor is caused to perform any embodiment of the first or second aspects.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION OF EMBODIMENTS

As described above, making measurements in images such as medical images, may require the expertise of an experienced practitioner, particularly if, for example, the measurement criteria for a particular object (e.g. such as particular organ or tumor) is not easily defined mathematically.

Figure 1A:
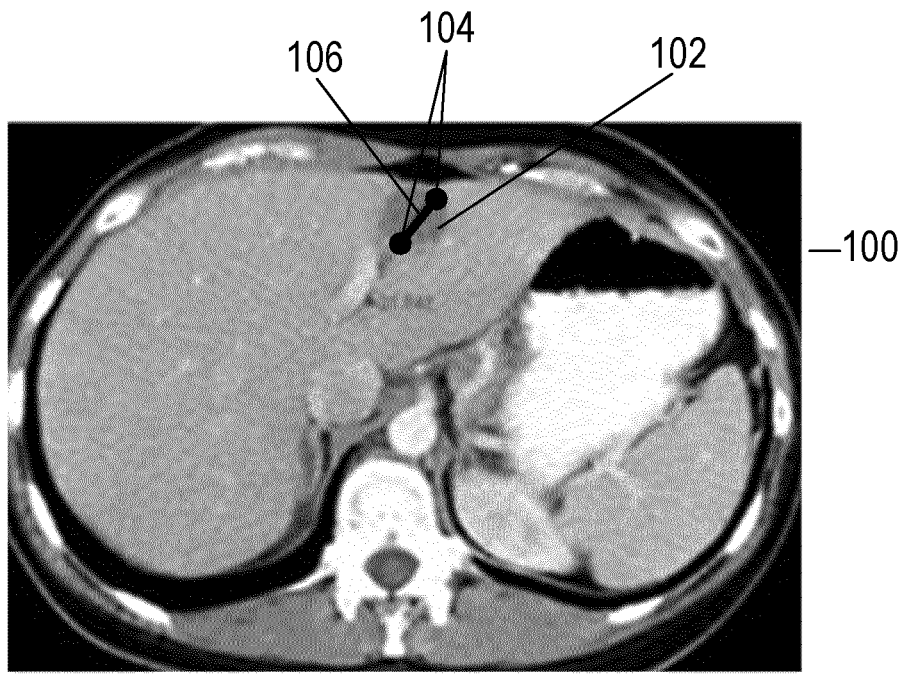
FIG. 1(a) illustrates a prior art method of making a measurement in an image.
Figure 1B:
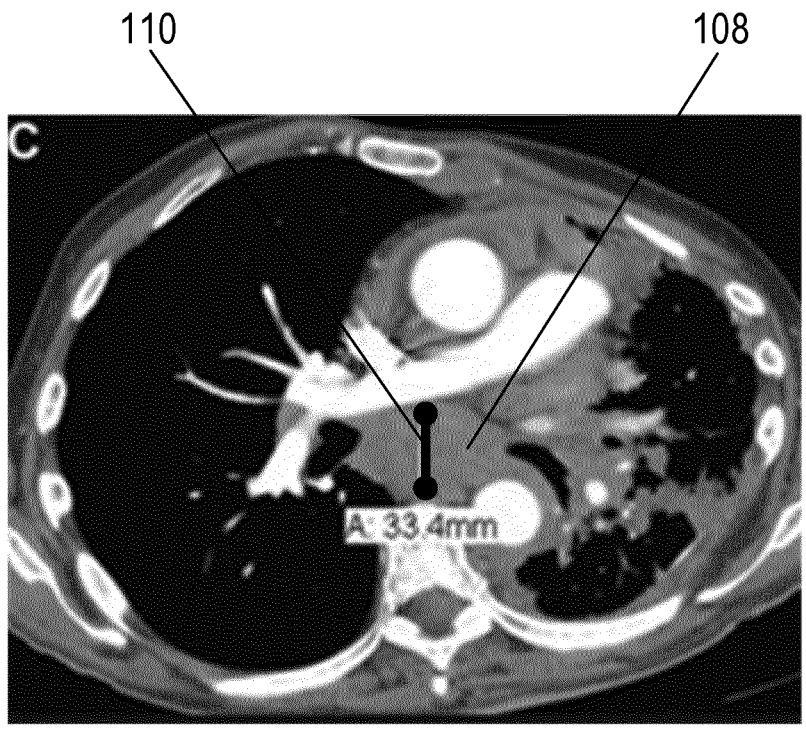
FIG. 1(b) illustrates a prior art method of making a measurement in an image.

FIG. 1(a) illustrates a prior art method of making a measurement in a medical image 100. In this method, when measuring a feature of interest in the image 100, such as the feature 102, an electronic caliper may be used. An electronic caliper, may, for example, comprise a pair of points 104 that may individually be moved/placed in the image by a clinician. The measurement is then made between the pair of points 104, e.g. along the line 106. Another example is illustrated in FIG. 1(b) whereby feature 108 is measured using caliper 110.

Figure 1C:
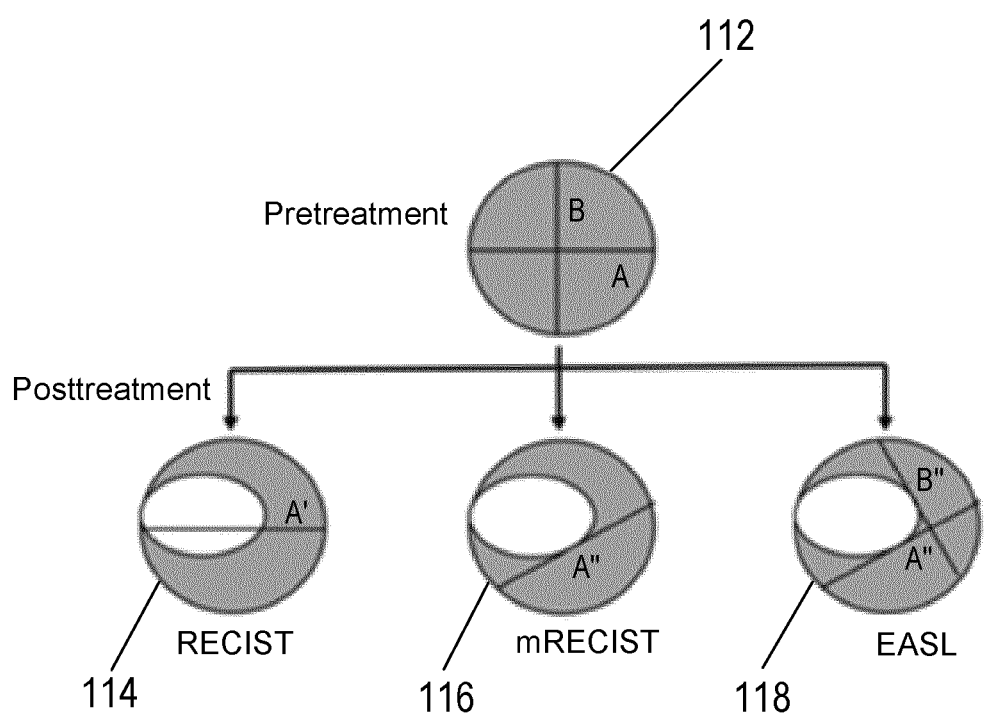
FIG. 1(c) illustrates different methods of measuring a tumor according to a prior art method.

The precise placing of the ends of the electronic caliper, e.g. the pair of points 104, may be subjective and/or require specialist knowledge. This is illustrated in FIG. 1(c) which illustrates different types of measurement that may be applied to a tumor. FIG. 1(c) is taken from the paper by Lei Liu et al entitled "EASL- and mRECIST-Evaluated Responses to Combination Therapy of Sorafenib with Transarterial Chemoembolization Predict Survival in Patients with Hepatocellular Carcinoma, Journal of Clinical Cancer Research" DOI: 10.1158/1078-0432.CCR-13-1716 Published March 2014

The gray area within the nodules represents the enhanced viable lesions, and the white area represents non-enhanced or iodized oil-retaining lesions. Pretreatment measures are illustrated by the nodule 112. In this example, the distance A represents the maximum diameter of the entire tumor before treatment; and the diameter B, is perpendicular to A. Post-treatment measures include those illustrated by labels 114-118: whereby the distance A' represents the maximum diameter of the entire tumor after treatment; the distance A" represents the maximum diameter of the enhanced area of the tumor after treatment; and B" represents the diameter perpendicular to A".

Figure 2B:
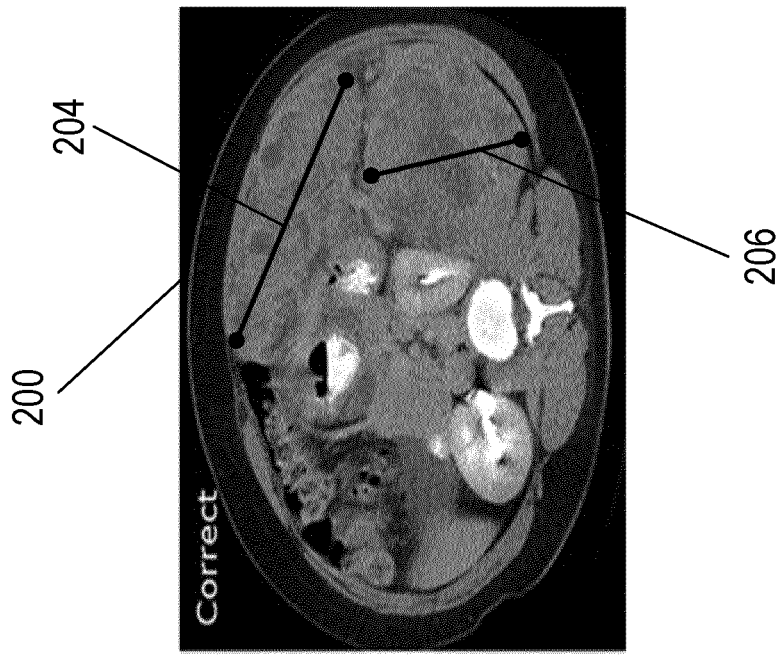
FIG. 2(b) illustrates the correct measurement of the two abdominal lesions in FIG. 2(a)
Figure 2A:
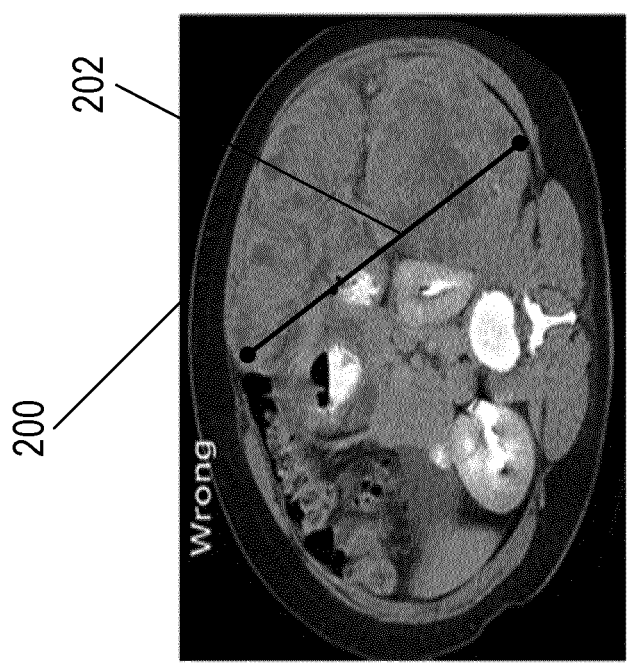
FIG. 2(a) illustrates an incorrect measurement of two abdominal lesions.

FIGS. 2a and 2b illustrate examples of incorrect 202 and correct 204, 206 electronic caliper placements in an image of two abdominal lesions. In this example, correct measurement comprises measuring the long axis of each lesion separately, rather than in one combined measurement.

It is an object of embodiments herein to provide improved methods of making measurements in images such as medical images.

Briefly, as will be described in detail below, some embodiments herein propose, amongst other things, to apply end-to-end machine learning to automatically suggest electronic caliper locations for routine clinical measurements, in particular for measurements which may not easily be defined in terms of mathematical or optimality criteria or objective functions, or involve the context of multiple organ constellations.

A machine learning model using e.g. Deep Convolutional Neural Networks may be trained to directly reproduce the start- and end-points of the caliper placements from the underlying image content. In the deployment phase, for a new incoming image, a model inference may be computed, yielding, for example, probability maps of suggested caliper locations, which may be presented as a graphical overlay to a user. In some embodiments, the user may interactively dispense unwanted calipers, or confirm or modify them in the usual way.

Figure 3:
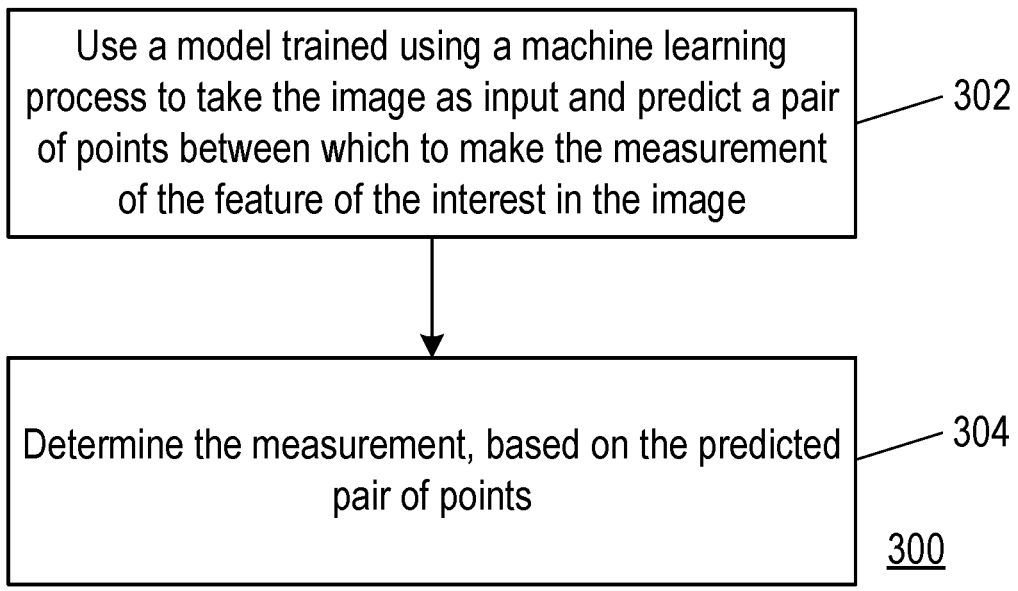
FIG. 3 illustrates a method according to some embodiments herein.

FIG. 3 illustrates a computer implemented method 300 of making a measurement associated with a feature of interest in an image according to some embodiments herein. In a first block 302 the method 300 comprises using a model trained using a machine learning process to take the image as input and predict a pair of points between which to make the measurement of the feature of interest in the image. In a second block 304 the method 300 then comprises determining the measurement, based on the predicted pair of points.

In this way, a model trained using a machine learning process may be used to determine a measurement of a feature of interest in an image, without the need for a trained expert clinician. If the model is trained, for example, using training data comprising examples of annotated measurements made by many clinicians, then the model may effectively combine the experience of all of the annotators, increasing accuracy and reducing the subjectivity of the measurement process.

In some embodiments, the image may comprise a medical image. A medical image may comprise an image acquired using any imaging modality. Examples of a medical image include, but are not limited to, a computed tomography (CT) image (for example, from a CT scan) such as a C-arm CT image, a spectral CT image or a phase contrast CT Image, an x-ray image (for example, from an x-ray scan), a magnetic resonance (MR) image (for example, from an MR scan), an ultrasound (US) image (for example, from an ultrasound scan), fluoroscopy images, nuclear medicine images, or any other three dimensional medical image.

The image may be (stored) in any format, for example, the image may be in a DICOM image format, FITS image format, JPEG image format, GIF image format, or any other image format.

The feature of interest may comprise any type of feature visible in the image. E.g. the model may be trained to predict a pair of points for any type of feature or any type of measurement. In embodiments where the image comprises a medical image, the feature of interest may comprise an anatomical feature, or part of an anatomical feature. For example, the feature of interest may comprise a feature associated with an organ or part of an organ, a vessel or part of a vessel. In some embodiments, the feature of interest may comprise a tumor. In some embodiments, the feature of interest may comprise a fetus. Generally, the measurement may be of, or associated with some aspect of the feature of interest. In some embodiments, the measurement may comprise a volumetric estimate.

Although examples herein will generally be given in terms of medical images, it will be understood that the principles described herein apply equally to making measurements in other types of images. Examples of other types of images include but are not limited to: making measurements of geological features in geological images such as geological radar surveys; making measurements of man-made or natural structures in satellite imagery; and making measurements of features of astronomical structures in astronomical images.

Generally, the image may comprise a two dimensional image, a three dimensional image, or any other dimensional image. Generally an image may comprise a plurality (or set) of image components. For example, in embodiments where the image comprises a two dimensional image, the image may be comprised of image components comprising pixels. In embodiments where the image comprises a three dimensional image, the image may be comprised of image components comprising voxels.

Generally, the principles herein may be applied to making measurements of any type of feature in any type of image where the measurement criteria is, for example, not easily defined mathematically (e.g. defined by custom) or requires a plurality of criteria to be evaluated in order to determine the appropriate placement of a pair of points between which to make the measurement.

In embodiments where the image comprises a medical image, the manner in which the measurement is made may be regulated, e.g. clinically regulated. For example, in embodiments where the image comprises a medical image, the pair of points may be positioned so as to satisfy a clinical requirement associated with the measurement.

In block 302, a model trained by a machine learning process is used to take the image as input and predict a pair of points between which to make the measurement of the feature of interest in the image.

The model may comprise any type of model that can be trained, using a machine learning process to take an image (e.g. such as a medical image) as input and predict an appropriate placement of a pair of points between which to make the measurement of the feature of interest in the image. In some embodiments, the model may be trained according to the method 400 as described below.

As will be described in more detail below with respect to the method 400, in some embodiments, the trained model may have been trained using training data comprising: i) example images; and ii) for each image, a ground truth pair of points indicating appropriate locations between which to make the measurement of the feature of interest in the example image. In this sense, the ground truth represents an example of the "correct" prediction for the corresponding input image.

In some embodiments, the model may comprise a trained neural network, such as a trained F-net or a trained U-net. The skilled person will be familiar with neural networks, but in brief, neural networks are a type of supervised machine learning model that can be trained to predict a desired output for given input data. Neural networks are trained using training data comprising example input data and the corresponding "correct" or ground truth outcome that is desired. Neural networks comprise a plurality of layers of neurons, each neuron representing a mathematical operation that is applied to the input data. The output of each layer in the neural network is fed into the next layer to produce an output. For each piece of training data, weights associated with the neurons are adjusted until the optimal weightings are found that produce predictions for the training examples that reflect the corresponding ground truths.

In other possible embodiments, the model may be trained using support-vector regression, or Random-Forest regression or other non-linear regressor. The skilled person will be familiar with these other types of supervised machine learning model that can be trained to predict a desired output for given input data.

Although neural networks are described herein, it will be appreciated that the teachings herein apply more generally to any type of model that can be used to predict an appropriate placement of a pair of points between which to make a measurement of a feature of interest in the image. For example, in some embodiments, the model comprises a supervised machine learning model. In some embodiments, the model comprises a random forest model or a decision tree. The model may comprise a classification model, or a regression model. Examples of both types are provided in the text below.

In some embodiments, the model is trained to take as input the image, e.g. just the image. In other embodiments the model may comprise additional input channels (e.g. take additional inputs). The model may take as input, for example, any one of, or any combination of the following types of parameters: i) an indication of the type of measurement that is to be required, ii) an indication of the type of image, e.g. the image modality etc iii) an indication of the contents of the image. Such inputs may enable the model to better predict the type of measurement required, thus improving the predictive power of the model.

In embodiments where the image comprises a medical image, the model may further take as input information relating to a clinical context or clinical purpose of the measurement and/or the medical image. Other inputs may include for example, an indication of the anatomical feature in the image, the type of measurement to be made, and/or an examination purpose or description.

The manner in which a clinician places a caliper in a medical image may depend on the display settings used to display the image to the clinician. Therefore in some embodiments, a display setting such as an image window/level setting, contrast setting or other display setting of the image, associated with the display settings under which the image is to be viewed may be provided as input to the model.

In embodiments where the image comprises a three-dimensional image, the model may further take as input a viewing angle (e.g. viewing perspective) into the three dimensional image. Generally a viewing perspective may be input into the model (e.g. axial, coronal, sagittal). The model may then be trained to determine the appropriate measurement, in view of the perspective that the viewer takes of the feature of interest in the image.

In some embodiments, the information relating to the clinical context of the measurement and/or the medical image may be obtained from meta-data stored in the image. For example, data stored in a Radiology Information System (RIS). Such data may be stored in a header of an image, such as a DICOM image header or FITS image header.

In some embodiments, the model may take as input a segmentation of the image. As such, the method 300 may further comprise blocks of performing a segmentation of the image, and providing a segment (or plurality of segments) from the segmentation as a further input to the model.

The skilled person will be familiar with image segmentation, but in brief, image segmentation involves extracting shape/form information about the objects or shapes captured in an image. This may be achieved by converting the image into constituent blocks or "segments", the pixels or voxels in each segment having a common attribute. In some methods, image segmentation may comprise fitting a model to one or more features in an image.

Examples of image segmentation that may be performed as part of the method 300 include, but are not limited to: Model-Based Segmentation (MBS), whereby a triangulated mesh of a target structure (such as, for example, a heart, brain, lung etc.) is adapted in an iterative fashion to features in an image, and Machine Learning (ML) segmentation whereby a ML model is used to convert an image into a plurality of constituent shapes (e.g. block shapes or block volumes), based on similar pixel/voxel values and image gradients. Further information about MBS as applied to medical images may be found, for example, in the paper by Ecabert, O., et al. 2008 entitled "*Automatic Model-Based Segmentation of the Heart in CT Images*"; IEEE Trans. Med. Imaging 27 (9), 1189-1201.

A segmentation may be used in conjunction with the image to enable the model to better determine edges and/or borders of the feature of interest (or other objects) in the image. This may improve the discriminatory power of the model and thus enable the model to predict better placement of the pair of points between which to make the measurement.

As noted above, the model takes the inputs and uses them to predict a pair of points between which to make the measurement of the feature of interest in the image. In other words, the output of the model may comprise a pair of points, e.g. the location of two points in the image. The outputs may comprise co-ordinates for each point of the pair of points. In some embodiments, for example, regression techniques (e.g. modified Convolution Neural Networks) may be used in order to predict the coordinates for the measurements directly (similar to a region proposal network).

In some embodiments, the model provides as output one or more confidence maps indicating confidence values associated with different placements of the pair of points. For example, in some embodiments, Fully Convolutional Neural Networks (U-Net, F-Net, . . . ) or other regressor models (Support-Vector regression, Random-Forest regression) could be trained to predict "confidence maps" for the location of the individual landmarks in new images. In such an embodiment, the peaks in the output map may represent the predicted optimal start and end points for the measurements. Confidence maps in this way comprise an example of a classification-based technique.

In some embodiments, the model may further output a label that describes the type of measurement (descriptor, type) for this specific measurement. Such a label may also be trained and predicted by the model.

Examples of other outputs that may be predicted additionally or alternatively to those described above include an estimate of the measurement (e.g. an estimate of the distance between the pair of points or the peaks of the contour map).

In some embodiments, the pair of points represent end points of an electronic caliper, as described with respect to FIGS. 1(a)-(c) and FIG. 2. The skilled person will be familiar with electronic calipers. In such embodiments, in block 304, the measurement may be determined between the end points of the electronic caliper.

Other representations of electric calipers are also contemplated herein, in addition to those illustrated in FIGS. 1(a)-(c) and FIG. 2. For example, in some embodiments, a first point in the pair of points may represent the center of a circle (or sphere in 3D), and the second point in the pair of points may represent the boundary of the circle/sphere (e.g. the radius). In such an example, the measurement may be determined in block 304, for example, relative to the radius of the circle.

In another example, the pair of points may comprise a first point representing one corner of a rectangular box, and a second point representing a second (e.g. opposite) corner of the rectangular box. In such an example, the measurement may be determined in block 304 relative to any (predefined) pair of corners of the rectangular box.

In block 304, the measurement may be determined from the distance between the pair of points. The pixel distance may be converted into a physical distance using calibrations that will be familiar to the skilled person.

Turning now to a specific embodiment, the pair of points may be determined, for example, using keypoint detection. Keypoint detection may be considered a regression problem, for example. In an example embodiment using keypoint detection, the model may comprise a sequence of convolutional neural networks that may be employed to directly predict the coordinates of individual landmarks. In this embodiment, a first network in the sequence may take the entire image as an input (e.g. such that global features can be taken into account) while subsequent networks (using regions predicted from the previous network as an input) may allow for refinement in the estimated coordinates. Alternatively, this task can be implemented as a single end-to-end convolutional neural network (or other models). In some embodiments, it may be advantageous to use cascaded (stacked) networks (or other models).

The method 300 may further comprise, displaying the image and/or the predicted pair of points to the user. In embodiments where a probability map is output by the model, the peaks of the probability maps may then be identified and used as the locations for one or more suggested calipers, which may be presented as a graphical overlay to the user. The user may then, for example, adjust (e.g. drag and drop) one or other of the pair of points to improve the positioning, as they see fit.

Figure 4:
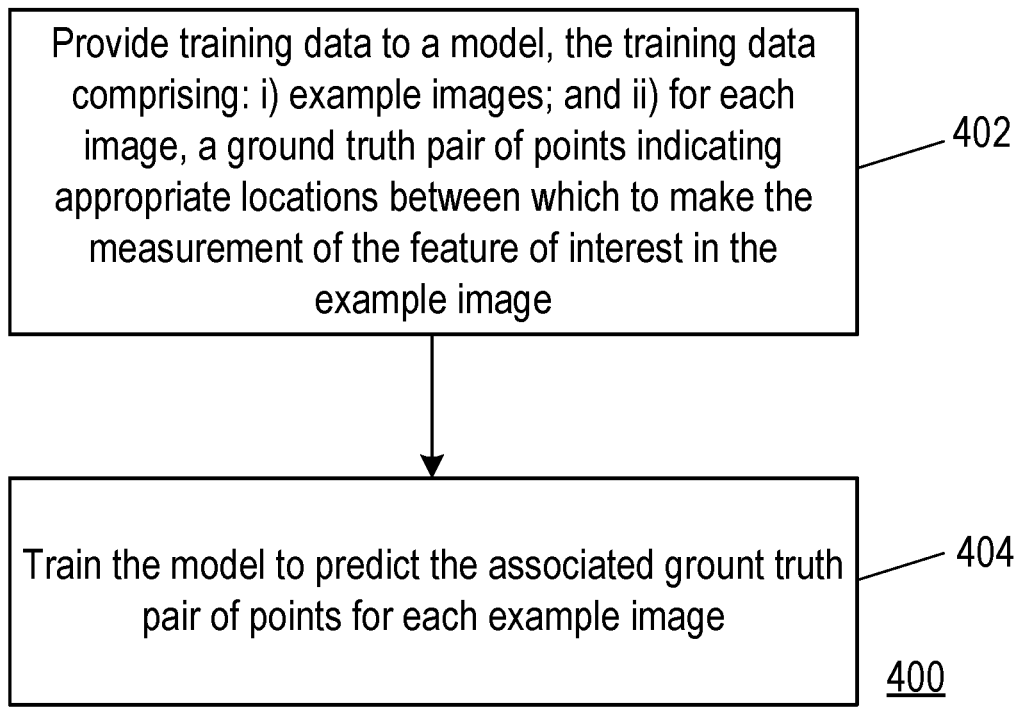
FIG. 4 illustrates another method according to some embodiments herein.

Turning now to the training of the model, in some embodiments the model may be trained according to the method 400 as shown in FIG. 4. The method 400 comprises a computer implemented method of training a model for use in making a measurement associated with a feature of interest in an image. A model trained using the method 400 may be used in the method 300 as described above.

The method 400 may comprise, in a first block 402, providing training data to the model, the training data comprising: i) example images; and ii) for each example image, a ground truth pair of point indicating appropriate locations between which to make the measurement of the feature of interest in the example image. In a second block 404 the method 400 may comprise training the model to predict the associated ground truth pair of points for each example image.

The skilled person will be familiar with methods of training a model such as a neural network using training data (e.g. gradient descent etc.) and appreciate that the training data may comprise many hundreds or thousands of rows of training data. The training data may further comprise additional example input fields and additional ground truth output fields. In other words the model may be trained to take further inputs with which to make the prediction and also to provide additional outputs.

Possible other input and output parameters were discussed in detail above with respect to the method 300 (see in particular step 302) and the detail therein will be understood to apply equally to the input and output training data of the method 400.

The training data may be comprised of images annotated with the appropriate positions of the pair of points, e.g. appropriate or "correct" end points between which to make the measurement.

In some embodiments, the model may further output a label that describes the type of measurement (descriptor, type) for this specific measurement. In such embodiments, the training data may further comprise a label describing the type of measurement that is to be made. In such embodiments, the model may be further trained to predict the label.

In some embodiments, the ground truth pair of points for each example image may be obtained from meta data of the associated example image. For example, a clinician may have previously analyzed a medical image and determined appropriate positioning of an electronic caliper for a particular measurement of an anatomical feature of interest in the image. This analysis may be stored, for example, in an image header. As such, historical data may be used as training data for the model.

In some embodiments, training data may be obtained by displaying an example image to a user, and receiving the ground truth pair of points from an input provided by the user. For example, a user may be prompted to annotate an image in real time. In such embodiments, the training data may further comprise, for each example image, a display setting associated with displaying the example image to the user. Such a display setting may be further provided as input to the model during the training.

Display settings were described in more detail above with respect to the method 300 and the detail therein will be understood to apply equally to the method 400.

Figure 5:
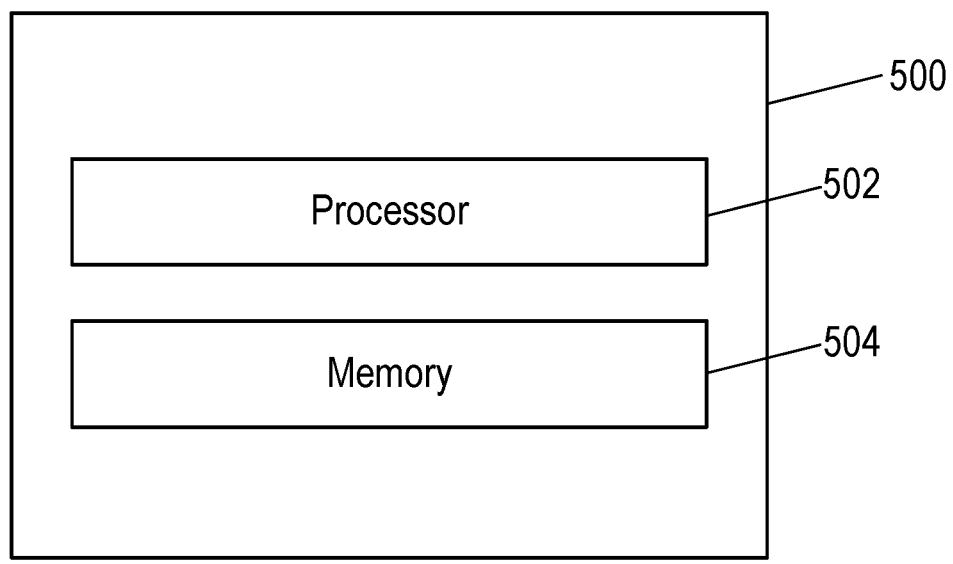
FIG. 5 illustrates a system according to some embodiments herein.

Turning now to FIG. 5 in some embodiments there is a system 500 for displaying a three dimensional volume of an image on a two dimensional display. The system may form part of specialized equipment, such as specialized medical equipment, alternatively, the system may form part of a computer system e.g. such as a laptop, desktop computer or other device, or the system 500 may form part of the cloud/a distributed computing arrangement.

The system comprises a memory 504 comprising instruction data representing a set of instructions and a processor 502 configured to communicate with the memory and to execute the set of instructions. Generally, the set of instructions, when executed by the processor, may cause the processor to perform any of the embodiments of the methods 300 or 400 as described above. In some implementations, the set of instructions can comprise a plurality of software and/or hardware modules that are each configured to perform, or are for performing, individual or multiple steps of the method described herein.

More specifically, in some embodiments, the set of instructions, when executed by the processor, cause the processor to use a model trained using a machine learning process to take the image as input and predict a pair of points between which to make the measurement of the feature of interest in the image, and determine the measurement, based on the predicted pair of points.

Using a model trained using a machine learning process to take the image as input and predict a pair of points between which to make the measurement of the feature of interest in the image, and determining the measurement, based on the predicted pair of points were described in detail with respect to blocks 302 and 304 of method 300 and the detail therein will be understood to apply equally to the configuration of embodiments of the processor 502.

In some embodiments, the set of instructions, when executed by the processor, may additionally or alternatively cause the processor to, provide training data to the model, the training data comprising: i) example images; and ii) for each image, a ground truth pair of point indicating appropriate locations between which to make the measurement of the feature of interest in the example image, and train the model to predict the associated ground truth pair of points for each example image.

Providing training data to a model and training a model to predict the ground truth pair of points for each example image were described above with respect to blocks 402 and 404 of the method 400 and the detail therein will be understood to apply equally to the configuration of embodiments of the processor 502.

Generally, the processor 502 can comprise one or more processors, processing units, multi-core processors or modules that are configured or programmed to control the system 500 in the manner described herein. In particular implementations, the processor 502 can comprise a plurality of software and/or hardware modules that are each configured to perform, or are for performing, individual or multiple steps of the method described herein. The processor 502 can comprise one or more processors, processing units, multi-core processors and/or modules that are configured or programmed to control the system 500 in the manner described herein. In some implementations, for example, the processor 502 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

The memory 504 is configured to store program code that can be executed by the processor 102 to perform the method described herein. Alternatively or in addition, one or more memories 504 may be external to (i.e. separate to or remote from) the system 500. For example, one or more memories 504 may be part of another device. Memory 504 can be used to store images, information and/or data received, calculated or determined by the processor 502 of the apparatus 500 or from any interfaces, memories or devices that are external to the system 500. The processor 502 may be configured to control the memory 504 to store the images, information, data and measurements calculated or determined herein.

In some embodiments, the memory 504 may comprise a plurality of sub-memories, each sub-memory being capable of storing a piece of instruction data. For example, at least one sub-memory may store instruction data representing at least one instruction of the set of instructions, while at least one other sub-memory may store instruction data representing at least one other instruction of the set of instructions.

In some embodiments, the system 500 may further comprise a two dimensional display for displaying/rendering the image and/or the pair of points and/or a line indicating the position of the measurement. The display may comprise, for example, a computer screen, a screen on a mobile phone or tablet, a screen forming part of a medical equipment or medical diagnostic tool.

The system may further comprise a user input, such as a keyboard, mouse or other input device that enables a user to interact with the system, for example, to provide initial input parameters to be used in the method described herein and/or for adjusting the output of the model (e.g. the positions of the pair of points as predicted by the model).

It will be appreciated that FIG. 5 only shows the components required to illustrate this aspect of the disclosure and, in a practical implementation, the system 500 may comprise additional components to those shown. For example, the system 500 may comprise a battery or other power supply for powering the system 500 or means for connecting the system 500 to a mains power supply.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer implemented method of making a measurement associated with a feature of interest in a image, the method comprising:
    using a model trained using a machine learning process to take the image as input and predict a pair of points between which to make the measurement of the feature of interest in the image, wherein the model provides as output one or more confidence maps indicating confidence values associated with different placements of the pair of points; and
    determining the measurement, based on the predicted pair of points.

2. The method of claim 1, the model having been trained using training data comprising:
    i) example images; and
    ii) for each example image, a ground truth pair of points indicating appropriate locations between which to make the measurement of the feature of interest in the example image.

3. The method of claim 1, wherein the image comprises a medical image and the pair of points are positioned so as to satisfy a clinical requirement associated with the measurement.

4. The method of claim 3, wherein the model further takes as input information relating to a clinical context of the measurement and/or the medical image.

5. The method of claim 4, wherein the information relating to the clinical context of the measurement and/or the medical image is obtained from meta-data stored in the image.

6. The method of claim 1, wherein the pair of points comprise:
    end points of an electronic caliper;
    a first point representing the centre of a circle or sphere, and a second point representing a boundary of the circle or sphere; or
    a first point representing one corner of a rectangular box, and a second point representing a second corner of the rectangular box.

7. The method of claim 1, wherein the method further comprises:
    performing a segmentation of the image; and
    providing a segment from the segmentation as a further input to the model.

8. The method of claim 1, wherein the pair of points are determined using keypoint detection.

9. The method of claim 1, wherein the image comprises a medical image, further wherein the pair of points are positioned so as to satisfy a clinical requirement associated with the measurement, and wherein the method further comprises:
    performing a segmentation of the medical image; and
    providing a segment from the segmentation as a further input to the model.

10. A method of training a model for use in making a measurement associated with a feature of interest in a image, the method comprising:
    providing training data to the model, the training data comprising: i) example images; and ii) for each example image, a ground truth pair of points indicating appropriate locations between which to make the measurement of the feature of interest in the example image; and training the model to predict the associated ground truth pair of points for each example image and to provide as output one or more confidence maps indicating confidence values associated with different placements of the pair of points.

11. The method of claim 10, wherein the ground truth pair of points for each example image are obtained from meta data of the associated example image.

12. The method of claim 10, wherein the ground truth pair of points for each example image are obtained by:
displaying the example image to a user; and
receiving the ground truth pair of points from an input provided by the user.

13. The method of claim 12, wherein the training data further comprises:
for each example image, a display setting associated with displaying the example image to the user; and wherein the display setting is further provided as input to the model during the training.

14. A system for making a measurement associated with a feature of interest in a image, the system comprising:
a memory comprising instruction data representing a set of instructions; and
a processor configured to communicate with the memory and to execute the set of instructions, wherein the set of instructions, when executed by the processor, cause the processor to:
use a model trained using a machine learning process to take the image as input and predict a pair of points between which to make the measurement of the feature of interest in the image, and wherein the model provides as output one or more confidence maps indicating confidence values associated with different placements of the pair of points; and
determine the measurement, based on the predicted pair of points.

15. The system of claim 14, wherein the image comprises a medical image, further wherein the pair of points are positioned so as to satisfy a clinical requirement associated with the measurement, and wherein the set of instructions, when executed by the processor, further cause the processor to:
perform a segmentation of the medical image; and
provide a segment from the segmentation as a further input to the model.

16. The system of claim 14, the model having been trained using training data comprising:
i) example images; and
ii) for each example image, a ground truth pair of points indicating appropriate locations between which to make the measurement of the feature of interest in the example image.

17. The system of claim 14, wherein the model further takes as input information relating to a clinical context of the measurement and/or the image.

18. The system of claim 17, wherein the information relating to the clinical context of the measurement and/or the image is obtained from meta-data stored in the image.

19. A non-transitory computer readable medium storing instructions that, when executed by one or more processors, cause the one or more processors to:
use a model trained using a machine learning process to take an image as input and predict a pair of points between which to make a measurement of a feature of interest in the image;
determine the measurement, based on the predicted pair of points;
wherein the model is trained by:
providing training data to the model, the training data comprising: i) example images; and ii) for each example image, a ground truth pair of points indicating appropriate locations between which to make the measurement of the feature of interest in the example image; and
training the model to predict the associated ground truth pair of points for each example image and to provide as output one or more confidence maps indicating confidence values associated with different placements of the pair of points.

20. The non-transitory computer readable medium of claim 19, wherein the ground truth pair of points for each example image are obtained from meta data of the associated example image.

21. The non-transitory computer readable medium of claim 19, wherein the ground truth pair of points for each example image are obtained by:
displaying the example image to a user; and
receiving the ground truth pair of points from an input provided by the user.

* * * * *